United States Patent Office 3,639,495
Patented Feb. 1, 1972

3,639,495
CATALYTIC HYDROCRACKING PROCESS
Charles C. Brewer and Charles R. Killian, Baton Rouge, La., assignors to Foster Grant Co., Inc., Leominster, Mass.
No Drawing. Continuation-in-part of application Ser. No. 706,806, Feb. 20, 1968. This application Mar. 9, 1970, Ser. No. 17,901
Int. Cl. C07c 3/58
U.S. Cl. 260—672
16 Claims

ABSTRACT OF THE DISCLOSURE

A feed stock of aromatic alkylation residues is subjected to hydrocracking by the use of a catalyst which may be a mixture of oxide or molybdenum and cobalt, molybdenum and nickel, or molybdenum, cobalt and nickel, and a carrier, such as alumina.

---

This application is a continuation-in-part of U.S. patent application Ser. No. 706,806, filed Feb. 20, 1968.

This invention relates generally to the catalytic hydrocracking of distillation residues which result from the production of alkylbenzene compounds, such as ethylbenzene, methylethylbenzene, and diethylbenzene. More particularly, this invention relates to the catalytic hydrocracking of the distillation residues from the alkylation of benzene and alkylbenzene, such as toluene and ethylbenzene, with ethylene to produce alkylbenzenes, such as ethylbenzene methylethylbenzene, and diethylbenzene. The process of this invention converts a substantial amount of distillation residues which have very low if any economic value to valuable aromatic compounds.

In a widely used method for the production of vinylbenzenes, benzene and alkylbenzenes, such as toluene and ethylbenzene, are alkylated with ethylene by the use of Friedel-Crafts type catalysts or other alkylation catalysts, such as alumina. The product from the alkylation reaction is removed by distillation at reduced pressure until all mono-, di- and tri- and some tetrasubstituted benzene compounds have been removed. In the production of ethylbenzene, the distillation is stopped when the temperature is about 400° F. at a pressure of about 25 mm. of mercury. The residue from the distillation comprises a mixture of polymethyl and polyethylbenzenes, as well as aromatic compounds, such as indanes, napthalenes, diphenyls, acenaphthalenes, and phenanthrenes. This distillation residue is generally only suitable for use as fuel oil. The product from the alkylation step is catalytically dehydrogenated to provide vinylbenzenes, such as styrene, vinyltoluene, ethylvinylbenzene, and divinylbenzene.

In the process of this invention the feed stock, which comprises the residue from the distillation of the alkylation product, is passed into a reactor, preferably at an elevated temperature, such as temperature from about 300° to about 600° F., and is mixed with hydrogen as it enters the reactor. The amount of hydrogen mixed with the feed stock is at least an amount which is sufficient to saturate any unsaturated hydrocarbon compounds which result from cracking the feed stock components, and preferably from about 22.6 to about 40 standard cubic feet of hydrogen per pound of feed stock. If the amount of hydrogen is below about 22.6 standard cubic feet per pound of feed stock, the unsaturated compounds formed are not fully hydrogenated and if the amount of hydrogen is above about 40 standard cubic feed per pound of feed stock, some hydrogen is not utilized. The mixture of feed stock and hydrogen is passed through a bed of catalyst which is maintained at a temperature of from about 800° F. to about 1300° F., preferably from about 1000° to about 1200° F. If the temperature of the catalyst bed is below about 800° F. the reaction rate is undesirably low and if the temperature of the catalyst bed is above about 1300° F., an excessive amount of carbon is formed as a result of the cracking of the hydrocarbon components of the feed stock, which decreases the catalyst activity and lowers the yield of desirable aromatic products. The pressure within the reactor is maintained within the range of from about 150 to about 700 p.s.i.g., preferably from about 200 to about 400 p.s.i.g. If the pressure is below about 150 p.s.i.g., the hydrocracking reactions do not go to the desired completion because the partial pressure of hydrogen is too low. If the pressure is greater than about 700 p.s.i.g., there is excessive cracking of the hydrocarbon components of the feed stock, which results in carbon formation and a shortened life of the catalyst. The feed stock is passed through the catalyst bed at a rate of from about 0.3 to about 3.5 pounds of feed stock per pound of catalyst per hours. If the rate is below about 0.3 pound of feed stock per pound of catalyst per hour, the process is inefficient and uneconomical. If the rate is greater than about 5 pounds of feed stock per pound of catalyst per hour, the hydrocracking reactions are incomplete and this results in a low conversion and a low yield of the desired saturated aromatic compounds.

The end product of the hydrocracking reactions is a low viscosity liquid which may be degassed and fractionally distilled. By distilling the degassed stream to a temperature of up to 165° C., at atmospheric pressure, a distillate is obtained which contains utilizable materials, such as benzene, toluene, ethylbenzene, xylenes, methylethylbenzenes, and diethylbenzene. The distillate may be recycled to the alkylation reaction or further fractionated to provide substantially pure components. The residue from the distillation is composed largely of polyalkylbenzenes and saturated polymeric materials and may be used as fuel oil, or recycled and combined with the hydrocracking feed stock.

In general, hydrocracking catalysts suitable for use in the practice of this invention are oxides of metals, such as cobalt, nickel, and molybdenum, which are supported on a material such as alumina. The preferred catalysts contain a combination of cobalt and molybdenum oxides, a combination of nickel and molybdenum oxides, and a combination of cobalt and molybdenum oxides promoted by nickel oxides.

More particularly the catalysts which may be used in the process of this invention are cobalt-molybdenum oxides, nickel oxide promoted cobalt- molybdenum oxide, or nickel-molybdenum oxides on a support material, preferably alumina, and are prepared in general by adding a controlled amount of strong acid to a mixture of the metallic compounds and a carrier, such as alumina. Sufficient water is added to reduce the mixture to a somewhat fluid consistency suitable for extrusion and the batch is passed through a suitable die, preferably of stainless steel, to form shaped extrudates. The extruded material is then dried and/or calcinated at high temperateure to drive off the water and convert the metallic compounds to oxides supported on the carrier.

More particularly, the preferred method of catalyst manufacture comprises mixing alumina hydrate and molybdenum oxide with an aqueous solution of a cobalt salt or with a nickel salt or with a mixture of cobalt and nickel salts, which are convertible to cobalt oxide and nickel oxide upon calcination. In the preferred mixing procedure, the molybdenum oxide, cobalt and nickel compounds are dispersed uniformly throughout the alumina and a damp solid mixture is formed. Then a strong mineral acid, such as nitric acid, hydrochloric acid, or sulfuric acid, is added in a controlled amount to convert the damp solid into an extrudable paste. When the acid is nitric acid, the amount of acid selected should be at least 2.5% by weight of commercial concentrated (63%) acid, based on the total weight of the finished product, 5% to 10% being the preferred range. The amount of concentrated acid can exceed 10% by weight, as the excess is removed during calcination, but for reasons of economy such an excess is usually undesirable. With other mineral acids, mole equivalent quantities of acid are selected. Sufficient water is added to the mixture, simultaneously and/or subsequently, form an extrudable paste and the catalyst mixture is passed through a die or other apparatus to form extrusions. The amount of water used in a preparing the extrudable paste is selected with regard to the consistency of the mixture after the acid has been added. A certain amount of water is added with the acid and the additional water which may be required to produce an extrudable mass is selected by simple experimentation to achieve a paste of the proper consistency. The extrusions are clacined at a temperature such that the moisture is evaporated, the salts of cobalt and nickel are decomposed, the alumina is partially dehydrated, and the extrusions are converted into hard catalyst pellets which have great physical strength and will withstand repeated regeneration without appreciable deterioration.

Certain variations from the above-described preferred procedure may be employed if desired. For example, if the compounds utilized are compatible with the acid used, the acid addition may be made simultaneously with the cobalt and nickel compounds. Moreover, it is not necessary that the acid be highly concentrated at the time of addition, and if desired, all or some of the water added to adjust the composition to an extrudable paste may be mixed with the acid prior to addition of the acid to the mixture.

The carrier or support material used in forming the extruded catalyst according to this invention is alumina, preferably a hydrated alumina, such as that containing approximately equal proportions of beta-$Al_2O_3 \cdot H_2O$ and alpha-$Al_2O_3 \cdot H_2O$, which upon calcination at a temperature within the range of from 700° F. to 900° F. is converted largely to gamma-$Al_2O_3$. Other hydrated aluminas, such as alpha $Al_2O_3 \cdot 3H_2O$, as well as calcined or otherwise dehydrated alumina can be used in producing the catalyst. During the calcination of the extruded alumina catalyst, high temperatures should be avoided or "dead burned" alumina may result. The preferred calcining temperature is in the range of 600° to 1000° F., although higher temperatures not exceeding the sublimation temperature (approximately 2300° F.) of molybdenum trioxide may be used.

When the catalyst is a cobalt-molybdenum or nickel-molybdenum oxide mixture, the atomic ratio of cobalt to molybdenum and nickel to molybdenum may vary from 1 to 5 to 1 to 1. When the catalyst is a nickel oxide promoted cobalt-molybdenum oxide mixture, the atomic ratio of the combined nickel and cobalt to the molybdenum may vary from 1 to 5 to 1 to 1. The relative quantities may be controlled by adjusting the amounts of molybdenum oxide and nickel and cobalt salts used in the initial steps of the catalyst manufacture. The cobalt salt and nickel salt may be any cobalt or nickel salt which is soluble in water and convertible to the oxide upon calcination, such as cobalt or nickel chlorides, cobalt or nickel nitrates, and cobalt or nickel sulfates. The pH of the solution must be less than about 7 or the cobalt and nickel salts may precipitate early. The amounts of catalytically active materials in the finished catalyst should usually be as small as possible consistent with the required activity to accomplish the desired reaction. Generally speaking, the amount of cobalt and molybdenum in the cobalt-molybdenum catalyst will fall within the range of: Cobalt as CoO— 1 to 5% by weight, molybdenum as $MoO_3$— 2 to 20% by weight. The amounts of nickel and molybdenum in the nickel-molybdenum catalyst will fall within the range of: nickel as NiO— 1 to 5% by weight, molybdenum as $MoO_3$— 2 to 20% by weight. The amounts of nickel and molybdenum in the nickel-molybdenum catalyst will fall within the range of: Nickel as NiO— 1 to 50% by weight, Molybdenum as $MoO_3$— 2 to 20% by weight. The amounts of nickel, cobalt, and molybdenum in a nickel oxide promoted cobalt—molybdenum oxide mixture will fall within the range of: Cobalt as CoO plus nickel as NiO— 1 to 5% by weight, molybdenum as MoO— 2 to 20% by weight. The remainder of the catalyst is carrier.

Methods for preparing four different catalysts suitable for use in the process of this invention are given below. However, these methods are presented only by way of illustration of catalysts which may be used in the successful carrying out of the hydrocracking process of the appended claims.

CATALYST NO. 1

A mixture of 100 lbs. of hydrated alumina (27% water) and 9 lbs. of molybdenum trioxide is dry mulled for approximately 20 minutes. The hydrated alumina comprises approximately equal proportions of beta-$Al_2O_3 \cdot 3H_2O$ and alpha-$Al_2O_3 \cdot H_2O$. Then 26.5 lbs. of an aqueous solution of cobalt nitrate (sp. gr. 1.196) containing 1.8 lbs. of CoO is added and the mixture is wet mulled for approximately 10 minutes. The cobalt nitrate solution is prepared by dissolving cobalt metal in dilute nitric acid and controlling the excess of acid so that not more than 2% free acid is present. Next, 2.5 lbs. of nitric acid (63%) diluted with water are added and wet mulling is continued. Additional water (approximately 4.5 gal.) is added to give a paste of proper consistency for extrusion. The catalyst paste is then extruded through a 3/16 inch stainless steel die and the extrusions are clacined for one hour at 400° F., one hour at 650° F., and six hours at 950° F. The catalyst thus formed shows an analysis of 2.5% CoO and 12.0% $MoO_3$. It has a side crush strength of 29 lbs. dead weight load (DWL), and abrasion loss of only 5.05% and a bulk density of 45.4 lbs. per cubic foot.

CATALYST NO. 2

A mixture of 22 lbs. of hydrated alumina (27% water) and 2 lbs. of molybdenum trioxide is dry mulled for approximately 20 minutes. The hydrated alumina comprises approximately equal proportions of beta-$Al_2O_3 \cdot 3H_2O$ and alpha-$Al_2O_3 \cdot H_2O$. Then 91.5 ml. of an aqueous solution of cobalt nitrate (sp. gr. 1.530) and 9.65 ml. of an aqueous solution of nickel nitrate (sp. gr. 1.546) are added and the mixture is wet mulled for approximately 10 minutes. The cobalt nitrate solution is prepared by dissolving cobalt metal in dilute nitric acid and controlling the excess of acid so that not more than 2% free acid is present. Next, 340 ml. of 63% nitric acid are added and wet mulling is continued. Additional water (approximately 910 ml.) is added to give a paste of proper consistency for extrusion. The catalyst paste is then extruded through a 3/16 inch stainless steel die and the extrusions are calcined for one hour at 400° F., one hour at 650° F., and six hours at 950° F. The catalyst thus formed shows an analysis of 2.33% CoO, 2.81% NiO, and 9.25% $MoO_3$.

CATALYST NO. 3

A cobalt-nickel-molybdenum alumina extruded catalyst is prepared from the following materials:

| | Parts |
|---|---|
| NiO (as nickel nitrate solution) | 37.5 |
| CoO (as cobalt nitrate solution) | 50.0 |
| $MoO_3$ | 300 |
| Alumina hydrate | 2850 |
| Nitric acid | 62.5 |

The alumina and molybdenum trioxide are dry mulled together for ten minutes. The cobalt nitrate and nickel nitrate solutions are added followed by addition of the nitric acid (equivalent to 2.5% by weight of the finished product) and wet mulling is continued for a period of two hours. Then the consistency of the paste is adjusted by the addition of water to form an extrudable product which is extruded through a 3/16 inch die. The extruded material is calcined for one hour at 450° F., one hour at 650° F., and six hours at 950° F. On analysis, the catalyst is found to contain 1.9% CoO, 1.5% NiO, and 11.2% $MoO_3$.

CATALYST NO. 4

|   | Parts |
|---|---|
| NiO (as nickel nitrate solution) | 87.5 |
| $MoO_3$ | 300 |
| Alumina hydrate | 2850 |
| Nitric aid (63%) | 62.5 |

The alumina and molybdenum trioxide are dry mulled together for ten minutes. The nickel nitrate solution is added followed by the nitric acid (equivalent to 2.5% by weight of the finished product) and wet mulling is continued for a period of two hours. Then the consistency of the paste is adjusted by the addition of water to form an extrudable product which is extruded through a 3/16 inch die. The extruded material is calcined for one hour at 450° F., one hour at 650° F., and six hours at 950° F. On analysis, the catalyst is found to contain 3.4% NiO, and 11.2% $MoO_3$.

The following examples, which illustrate the hydrocracking process of this invention, are given for the purpose of illustrating the invention but are not to be construed as limiting it in scope. It will be readily appreciated by those skilled in the art that numerous modifications in conditions, concentrations, relative quantities of materials, and the like, may be made without departing from the invention.

Example 1

A feed stock which comprises the residue from the distillation up to a temperature of 400° F. at 25 mm. of mercury of crude ethylbenzene from the catalytic alkylation of benzene with ethylene, is heated to 300° F. and pumped into the top of a reactor containing a bed of Catalyst No. 2. Hydrogen is also introduced at the top of the reactor and mixed with the feed stock. The mixture of the feed stock and hydrogen is passed through the catalyst at a rate such that 0.35 pound of feed stock per hour per pound of catalyst and 23.0 standard cubic feet of hydrogen per pound of feed stock pass through the reactor. The average catalyst temperature is 800° F. and any heat required to keep the catalyst up to temperature, which is not provided by the heat of reaction, is supplied by electrical heating elements about the catalyst case. The total pressure within the reactor is 150 p.s.i.g. The reaction product is removed from the reactor at such a rate that the pressure within the reactor is maintained at the above level.

The product represents 70% by weight of the hydrocarbon content of the feed stock.

The product is degassed and fractionally distilled up to 165° C. at 760 mm. of Hg. The amount of distillate is 75% by weight of the product.

Example 2

The procedure of Example 1 is repeated except that the rate of feed is 0.4 pound of feed stock per hour per pound of catalyst, the amount of hydrogen is to 26.0 standard cubic feet per pound of feed stock, the average catalyst temperature is 960° F., and the total pressure within the reactor is 250 p.s.i.g.

The product represents 74% of the hydrocarbon content of the feed stock.

Example 3

The procedure of Example 1 is repeated except that the rate of feed is 0.8 pound of feed stock per hour per pound of catalyst. The amount of hydrogen is 30.0 standard cubic feet per pound of feed stock, the average catalyst temperature is 1000° F., and the total pressure within the reactor is 300 p.s.i.g.

The product represents 79% of the hydrocarbon content of the feed stock.

Example 4

The procedure of Example 1 is repeated except that the rate of feed is 2.0 pounds of feed stock per hour per pound of catalyst, the amount of hydrogen is 30.0 standard cubic feet per pound of feed stock, the average catalyst temperature is 1100° F., and the total pressure within the reactor is 300 p.s.i.g.

The product represents 79% of the hydrocarbon content of the feed stock.

Example 5

The procedure of Example 1 is repeated except that the rate of feed is 3.5 pounds of feed stock per hour per pound of catalyst, the amount of hydrogen is 35.0 standard cubic feet per pound of feed stock, the average catalyst temperature is 1125° F., and the total pressure within the reactor is 450 p.s.i.g.

The product represents 82% of the hydrocarbon content of the feed stock.

Example 6

The procedure of Example 1 is repeated except that the rate is 4.5 pounds of feed stock per hour per pound of catalyst, the amount of hydrogen is 38.0 standard cubic feet per pound of feed stock, the average catalyst temperature is 1250° F., and the total pressure within the reactor is 650 p.s.i.g.

The product represents 86% of the hydrocarbon content of the feed stock.

The compositions of the distillates of Example 1 through 6 are given in Table 1.

TABLE 1

| Example No. | 1 | 2 | 3 | 4 | 5 | 6 |
|---|---|---|---|---|---|---|
| Percent: | | | | | | |
| Distillate | 75.3 | 78.4 | 80 | 80.5 | 82.6 | 86.2 |
| Residue | 24.7 | 21.6 | 20 | 19.5 | 17.4 | 23.8 |
| Composition of distillate in percent of total product | | | | | | |
| Benzene | 5 | 8 | 8 | 7.5 | 8 | 6 |
| Toluene | 10 | 12 | 12.5 | 11.5 | 12 | 11 |
| Ethylbenzene | 30 | 39 | 38.5 | 37 | 39 | 32 |
| Intermediates | 10 | 10 | 11 | 11.5 | 11 | 13 |
| Diethylbenzene | 15 | 18 | 17 | 16 | 15.5 | 13 |
| Polyalkylated benzenes | 30 | 13 | 13 | 16.5 | 14.5 | 25 |

Example 7

The procedure of Example 1 is repeated except that Catalyst No. 1 is used, the rate of feed is 1.3 pounds of feed stock per hour per pound of catalyst, 30.0 standard cubic feet of hydrogen per pound of feed stock pass through the reactor, the average catalyst temperature is 1100° F., and the total pressure within the reactor is 300 p.s.i.g.

The product represents 76% of the hydrocarbon content of feed stock.

Example 8

The procedure of Example 1 is repeated except that Catalyst No. 1 used, the average catalyst temperature is 1100° F., the rate of feed is 1.7 pounds of feed stock per pound of catalyst, 32.0 standard cubic feet of hydrogen per pound of feed stock pass through the reactor, and the total pressure within the reactor is 300 p.s.i.g.

The product represents 78% of the hydrocarbon content of the feed stock.

Example 9

The procedure of Example 1 is repeated except that Catalyst No. 3 is used, the rate of feed is one pound of feed stock per hour per pound of catalyst, 40.0 standard cubic feet of hydrogen per pound of feed stock pass through the reactor, the average catalyst temperature is 1200° F., and the total pressure in the reactor is 150 p.s.i.g.

The product represents 69% of the hydrocarbon content of the feed stock.

Example 10

The procedure of Example 1 is repeated except that Catalyst No. 3 is used. The rate of feed is one pound of feed stock per pound of catalyst per hour, 40.0 standard cubic feet of hydrogen per pound of feed stock pass through the reactor, the average catalyst temperature is 1200° F., and the total pressure in the reactor is 300 p.s.i.g.

The product represents 72% of the hydrocarbon content of the feed stock.

Example 11

The procedure of Example 1 is repeated except that Catalyst No. 4 is used. The rate of feed is 0.5 pound of feed stock per pound of catalyst per hour, 30.0 standard cubic feet of hydrocarbon per pound of feed stock pass through the reactor, the average catalyst temperature is 1150° F., and the total pressure in the reactor is 150 p.s.i.g.

The product represents 63% of the hydrocarbon content of the feed stock.

Example 12

The procedure of Example 1 is repeated except that Catalyst No. 4 is used, the rate of feed is 1.5 pounds of feed stock per pound of catalyst per hour, 30.0 standard cubic feet of hydrocarbon per pound of feed stock pass through the reactor, the average catalyst temperature is 1150° F., and the total pressure in the reactor is 300 p.s.i.g.

The product represents 65% of the hydrocarbon content of the feed stock.

The compositions of the distillates of Examples 7 through 12 are given in Table 2.

TABLE 2

| Example No. | 7 | 8 | 9 | 10 | 11 | 12 |
|---|---|---|---|---|---|---|
| Percent: | | | | | | |
| Distillate | 78.8 | 80.2 | 74.5 | 77.5 | 80 | 81.5 |
| Residue | 21.2 | 19.8 | 25.5 | 22.5 | 20 | 28.5 |
| Composition of distillate in percent of total product | | | | | | |
| Benzene | 6 | 5.5 | 6.5 | 7.5 | 8.5 | 9.0 |
| Toluene | 9 | 8.5 | 10.5 | 11.0 | 7.5 | 8.5 |
| Ethylbenzene | 41 | 44 | 31 | 34 | 26 | 29.5 |
| Intermediates | 9.5 | 8.5 | 10.0 | 10.5 | 14 | 14.5 |
| Diethylbenzene | 15.5 | 14.5 | 16 | 15 | 12 | 12.5 |
| Polyalkylatedbenzenes | 19 | 19 | 26 | 22 | 32 | 26 |

The intermediates contain xylenes and methyl-ethyl-benzenes which boil over a narrow range. The polyalkylated benzenes have at least three alkyl groups. Both of these fractions may be recycled to the reactor.

The above descriptions and particularly the examples are set forth by way of illustration only. Various changes and modifications in the novel process described herein, such as will be apparent to those skilled in the art, may be made without departing from the spirit and scope of the invention herein disclosed.

What is claimed is:

1. A process for the recovery of valuable aromatic hydrocarbons from the hydrocracking of a feed stock of ethylbenzene distillation residue containing polyalkylbenzenes, diphenyl, and fused ring aromatic compounds, which comprises passing a mixture of the feed stock and hydrogen through a bed of hydrocarcking catalyst,
   (a) the amount of hydrogen being sufficient to saturate any unsaturated hydrocarbon which results from cracking the feed stock components,
   (b) passing the feed stock through the catalyst bed at a rate of from about 0.3 to about 3.5 pounds per pound of the catalyst per hour,
   (c) maintaining the temperature of the catalyst bed within the range of from about 800° F., to about 1300° F., and
   (d) maintaining the pressure of the feed stock and hydrogen within the range of from about 150 to about 700 p.s.i.g.

2. A process according to claim 1 in which the feed stock is passed through the catalyst bed at a rate of from about 0.35 to about 1.5 pounds of feed stock per pound of catalyst per hour, the amount of hydrogen is from about 22.6 to about 40 standard cubic feet of hydrogen per pound of feed stock, the catalyst is at a temperature within the range of from about 1000° F. to about 1200° F., and the pressure is within the range from about 200 to about 400 p.s.i.g.

3. A process according to claim 1 in which the catalyst comprises oxides of cobalt, nickel, and molybdenum on an alumina carrier and the atomic ratio of cobalt plus nickel to molybdenum is in the range of 1 to 5 to 1 to 1.

4. A process according to claim 1 in which the catalyst comprises oxides of cobalt and molybdenum on an alumina carrier and the atomic ratio of cobalt to molybdenum is within the range of 1 to 5 to 1 to 1.

5. A process according to claim 1 in which the catalyst comprises oxides of nickel and molybdenum on an alumina carrier and the atomic ratio of nickel to molybdenum is within the range of 1 to 5 to 1 to 1.

6. A process according to claim 1 in which the catalyst comprises oxides of cobalt, nickel, and molybdenum on an alumina carrier in which the amount of cobalt as CoO plus the nickel as NiO is within the range of from about 1 to 5% by weight, the amount of molybdenum as $MoO_3$ is within the range of from about 2 to 50% by weight, and the remainder is alumina.

7. A process according to claim 1 in which the catalyst comprises oxides of cobalt and molybdenum on an alumina carrier in which the amount of cobalt as CoO is within the range of from about 1 to 5% weight, the molybdenum as $MoO_3$ is within the range of from about 2–50% by weight, and the remainder is alumina.

8. A process according to claim 1 in which the catalyst comprises oxides of nickel and molybdenum on an alumina carrier in which the nickel as NiO is present in an amount within the range of from about 1 to 5% by weight, the molybdenum as $MoO_3$ is present in an amount of from about 2 to 20% by weight and the remainder is alumina.

9. A process according to claim 1 in which the product of the hydrocracking reaction is fractionally distilled and the residue from the distillation is recycled to the hydrocracking feed stock.

10. A process according to claim 9 in which the catalyst comprises oxides of cobalt, nickel, and molybdenum on an alumina carrier and the atomic ratio of cobalt plus nickel to molybdenum is in the range of 1 to 5 to 1 to 1.

11. A process according to claim 9 in which the catalyst comprises oxides of cobalt and molybdenum on an alumina carrier and the atomic ratio of cobalt to molybdenum is within the range of 1 to 5 to 1 to 1.

12. A process according to claim 9 in which the catalyst comprises oxides of nickel and molydenum on an alumina carrier and the atomic ratio of nickel to molybdenum is within the range of 1 to 5 to 1 to 1.

13. A process for the recovery of valuable aromatic hydrocarbons from a feed stock of ethylbenzene distillation residue containing polyalkylbenzenes, diphenyl, saturated polymeric materials, and fused ring aromatic compounds, which comprises passing a mixture of the feed stock and hydrogen through a bed of hydrocracking catalyst, the amount of hydrogen being sufficient to saturate any unsaturated hydrocarbons which result from cracking the feed stock compounds, the rate of flow of the feed stock through the catalyst bed being maintained at about 0.3 to about 3.5 pounds per pound of the catalyst per hour, the temperature of the catalyst bed being maintained within the range of about 800° F. to about 1300° F., and the pressure of the feed stock and hydrogen being maintained within the range of about 150 to about 700 p.s.i.g.

14. A process according to claim 13 in which the catalyst comprises oxides of cobalt, nickel, and molybdenum on an alumina carrier and the atomic ratio of cobalt plus nickel to molybdenum is in the range of 1 to 5 to 1 to 1.

15. A process according to claim 13 in which the catalyst comprises oxides of cobalt and molybdenum on an alumina carrier and the atomic ratio of cobalt to molybdenum is within the range of 1 to 5 to 1 to 1.

16. A process according to claim 13 in which the catalyst comprises oxides of nickel and molybdenum on an alumina carrier and the atomic ratio of nickel to molybdenum is within the range of 1 to 5 to 1 to 1.

References Cited

UNITED STATES PATENTS

| | | | |
|---|---|---|---|
| 3,090,820 | 5/1963 | Walker | 260—667 |
| 3,175,017 | 3/1965 | Myers | 260—672 |
| 3,501,545 | 3/1970 | Henry | 260—674 |

CURTIS R. DAVIS, Primary Examiner

U.S. Cl. X.R.

208—112; 260—669 R, 674 R